(12) United States Patent
Pitzer

(10) Patent No.: US 8,939,819 B2
(45) Date of Patent: Jan. 27, 2015

(54) TRANSPORTATION ASSEMBLY WITH SEPARATION DEVICE

(71) Applicant: Poly-clip System GmbH & Co. KG, Hattersheim (DE)

(72) Inventor: Rainhard Pitzer, Wiesbaden (DE)

(73) Assignee: Poly-clip System GmbH & Co. KG, Hattersheim (DE)

( * ) Notice: Subject to any disclaimer, the term of this patent is extended or adjusted under 35 U.S.C. 154(b) by 0 days.

(21) Appl. No.: 14/148,670

(22) Filed: Jan. 6, 2014

(65) Prior Publication Data

US 2014/0194041 A1   Jul. 10, 2014

(30) Foreign Application Priority Data

Jan. 7, 2013   (EP) ..................................... 13150374

(51) Int. Cl.
*A22C 11/00* (2006.01)
*A22C 15/00* (2006.01)

(52) U.S. Cl.
CPC ............. *A22C 11/006* (2013.01); *A22C 15/001* (2013.01)
USPC ......................................................... 452/49

(58) Field of Classification Search
USPC .......................... 452/21–32, 35–37, 46–49, 51
See application file for complete search history.

(56) References Cited

U.S. PATENT DOCUMENTS

| 4,233,709 | A | * | 11/1980 | Smith et al. ...................... 452/49 |
| 5,100,364 | A | * | 3/1992 | Kollross et al. ............... 452/185 |
| 7,618,307 | B2 | * | 11/2009 | Gladh ............................. 452/51 |
| 7,975,834 | B2 | | 7/2011 | Kessler |
| 8,545,293 | B2 | | 10/2013 | Lendenmann |

FOREIGN PATENT DOCUMENTS

| CH | 703 003 A1 | 10/2011 |
| DE | 34 37 830 A1 | 4/1986 |
| DE | 20 2006 019 883 U1 | 5/2007 |
| EP | 0 330 857 A1 | 9/1989 |
| EP | 2 156 743 A1 | 2/2010 |

* cited by examiner

*Primary Examiner* — Richard Price, Jr.
(74) *Attorney, Agent, or Firm* — Hahn Loeser & Parks LLP

(57) ABSTRACT

The present invention relates to a transportation assembly for transporting sausage shaped products out of a clipping machine for producing sausage-shaped products in a transportation direction to a rod-like storing element. Each sausage-shaped product comprises a filled tubular or bag-shaped packaging casing closed on at least one end by a closing means and a suspension element attached to the end closed by said closure means, the transportation assembly comprises a guiding device having a bar-shaped guiding element along which the sausage-shaped product is guided by its suspension element, and a transportation device for transporting the sausage-shaped product along the guiding element by engaging the suspension element of the sausage-shaped product.

The suspension element is held in an open configuration by the weight of the filled tubular or bag-shaped packaging casing. A separation device is provided at the guide element, for removing a suspension element from the guiding element.

8 Claims, 4 Drawing Sheets

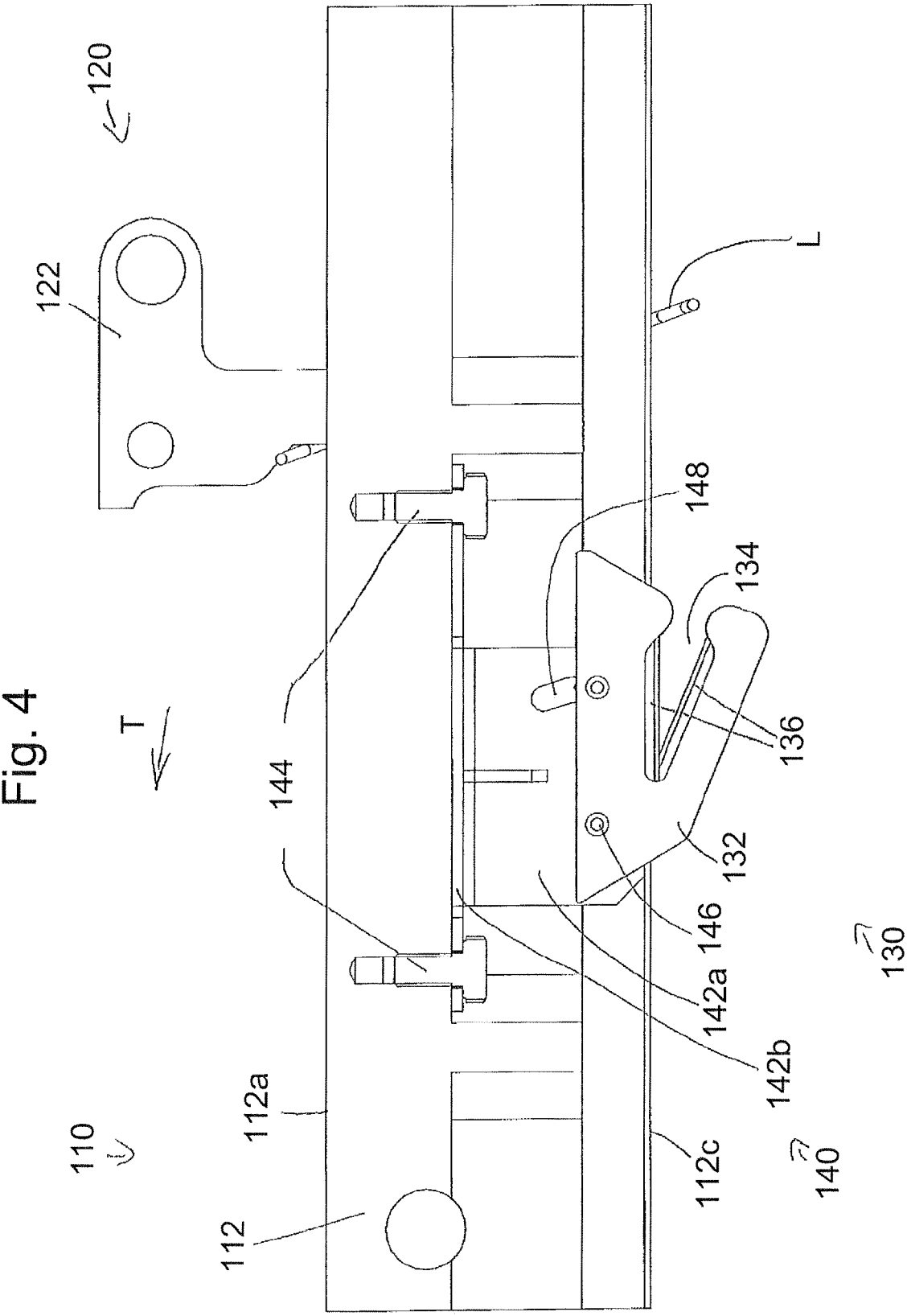

TRANSPORTATION ASSEMBLY WITH SEPARATION DEVICE

This application claims priority to, and the benefit of, European Patent Application No. 13 150 374.0-1655 filed Jan. 7, 2013 with the European Patent Office, which is hereby incorporated by reference.

BACKGROUND OF THE INVENTION

The present invention relates to a transportation assembly for transporting sausage shaped products, like sausages, out of a clipping machine for producing sausage-shaped products, according to the preamble of claim 1.

In particular, the present invention relates to a transportation assembly for transporting sausage shaped products, like sausages, out of a clipping machine for producing sausage-shaped products, in a transportation direction to a rod-like storing element, like a smoking rod, wherein each sausage-shaped product comprises a filled tubular or bag-shaped packaging casing closed on at least one end by a closing means, like a closure clip, and a suspension element, like a suspension loop, attached to the end closed by said closure means, the transportation assembly comprises a guiding device having a bar-shaped guiding element along which the sausage-shaped product is guided by its suspension element, and a transportation device for transporting the sausage-shaped product along the guiding element, by engaging the suspension element of the sausage-shaped product. The suspension element is held in an open configuration by the weight of the filled tubular or bag-shaped packaging casing to which it is attached by the closure means.

For the production of sausage-shaped products, like sausages, it is known that, a filling material like meat, adhesive, sealing material etc. is fed by a filling machine through a filling tube of a clipping machine into a tubular casing material, which is stored on the filling tube and which is closed at its front end, referred to the feeding direction of the filling material, by a closing clip. The tubular casing material is pulled-off from the filling tube while being filled by the filling pressure of the filling material. After a predetermined volume of filling material has been filled into said tubular casing material, a displacement device with a first and a second pair of displacement elements forms a plait-like portion of the tubular casing material and the clipping machine places and closes at least one closing clip at the plait-like portion forming the back end of the sausage shaped product, referred to the filling direction of the filling material, by respective closing tools which are reversibly movable towards the plait-like portion. Together with said closing clip arranged at the back-end of the sausage-shaped product, a suspension element, like a suspension loop, is attached to the plait-like portion for enabling the sausage-shaped product just produced to be handled, for example to be hung up on a smoking rod or the like. Subsequently, the sausage-shaped product just produced, is separated from the remaining tubular casing material by a knife or the like of a cutting device of the clipping machine and is transferred to a storage device or another machine for the next producing step.

From EP patent application 0 330 857, an apparatus for positioning sausages discharged from a clipping machine, on a smoking rod is known. A suspension loop of a sausage just produced, is caught by a catching device and is guided over a chain guide including a chain conveyor for positioning the sausages on the smoking rod as well as a sword for catching the suspension loop and guiding said loop to the chain conveyor. Horizontally aligned piston/cylinder arrangements are positioned adjacent to said sword for supporting the sword. For enabling the loop passing the sword, said pistons are alternately retracted according to the production cycle of the clipping machine.

Moreover, EP patent application 2 156 743 discloses a device for transferring a sausage shaped product comprising a suspension loop, from a clipping machine to a storage device, like a smoking rod. The suspension loop is caught by a catching device and is guided over a horizontally arranged bar of said transfer device. At its upper surface, said guide bar having a rectangular cross section, includes longitudinally grooves into which hooks of a transportation device project for transporting the sausage-shaped products along said bar towards the smoking rod. Bearing elements engage the side surfaces of said bar for supporting the bar. Said bearing elements comprise screw threads at their surfaces for enabling the suspension loop passing said supporting elements, while being along said bar.

In said known devices, the suspension loop attached to a sausage-shaped product, is pulled downwardly by the weight of the sausage-shaped product, in particular by the filled tubular or bag-shaped packaging casing attached to said suspension loop. Thereby, the suspension loop is held in an open or spread configuration. That means that the upper portion of the suspension loop lays firmly on the upper surface of the guide means, like the guide bar or the chain guide, whereas the lower portion of the suspension loop is pulled downwardly away from the guide means, thereby forming an open loop portion having the shape of a triangle depending on the width of the guide means.

During the production of sausage-shaped products, it may occur that a filled tubular or bag-shaped packaging casing is not correct affixed to the respective suspension element guided into the clipping machine, e.g. in case of damaged casing material or a defect closure clip. In these cases, a single suspension loop without a filled tubular or bag-shaped packaging casing is discharged from the clipping machine. Due to the missing weight, said single suspension loop may block the discharge path, or may get stuck at the transportation device thereby interfere the sausage-shaped products already hung up previously on the rod-like elements or the successive sausage-shaped products, respectively. It is an object of the present invention to provide a transportation assembly with which the above mentioned drawbacks can be overcome and which allows a safe transfer or transportation of the sausage-shaped products while being discharged out of a clipping machine.

SUMMARY OF THE INVENTION

According to the present invention, there is provided a transportation assembly for transporting sausage-shaped products, like sausages, out of a clipping machine for producing sausage-shaped products, in a transportation direction to a rod-like storing element, like smoking rod, wherein each sausage-shaped product comprises a filled tubular or bag-shaped packaging casing closed on at least one end by a closing means, like a closure clip, and a suspension element, like a suspension loop, attached to the end closed by said closure means, the transportation assembly comprises a guiding device having a bar-shaped guiding element along which the sausage-shaped product is guided by its suspension element, and a transportation device for transporting the sausage-shaped product along the guiding element, by engaging the suspension element of the sausage-shaped product. The suspension element is held in an open configuration by the weight of the filled tubular or bag-shaped packaging casing to which it is attached by the closure means.

In the inventive transportation assembly, a separation device is provided at the guide element, for removing a suspension element from the guiding element, which is transported by the transportation device without a tubular or bag-shaped packaging casing attached thereto.

In this configuration, a single suspension element, like a suspension loop, without a tubular or bag-shaped packaging casing attached thereto, is securely removed before said single suspension element reaches the rod-like element, like a smoking rod, on which said sausage-shaped products are hung up. Thus, said single suspension element may not block the discharge path, and may also not interfere the sausage-shaped products already hung up on the rod-like elements.

The guiding element can have different designs or configurations as long as it is able to expand or open or spread the suspension element of a sausage-shaped product. Preferably, the guiding element comprises at least two guiding surfaces for guiding the guiding element wherein the guiding surfaces extend at least substantially parallel to each other as well as at least substantially parallel to the transportation direction and are arranged in a distance across the transportation direction for expansion or spreading the suspension element. Thereby, the guiding surfaces can extend in an at least approximately vertical direction. The degree of spreading or opening of the suspension element is chosen such that a rod like storing element, like a smoking rod, can be positioned within the triangle formed by the lower part of the suspension element between the bottom surface of the guiding element and the sausage wherein the sausage forms one tip of that triangle. In a preferred embodiment, the guiding element has a cross-section, viewed in the transportation direction, in the form of the letter "H". This shape allows the arrangement of the separation device in the space between the lower sections of the two vertical arms of the letter "H".

According to an advantageous embodiment of the inventive transportation assembly, the guiding element has an at least partially approximately planar bottom portion to which the separation device is attached. A suspension element being in an open configuration, due to the fact that a filled tubular or bag-shaped casing is attached thereto, may pass said separation device without any problems, whereas a single suspension element without a tubular or bag-shaped packaging casing attached thereto is not in an opened configuration. Accordingly, said single suspension element is caught by said separation device, and is removed from the guiding device.

In a further advantageous embodiment of the inventive transportation assembly, the separation device comprises a cutting edge for cutting the suspension element guided along said cutting edge. The suspension loop cut off by said cutting edge may immediately fall off from the transportation assembly without interfering the further the production or transportation process.

The separation device may have any suitable form, like a straight edge or a curved edge including a sharpened portion. In a preferred embodiment, the separation device comprises an approximately V-shaped cutout facing in the counter direction of or opposite to the transportation direction. This configuration ensures a save catching of said single suspension element and also a safe cut off.

In a further embodiment of the inventive transportation assembly, adjustment means for adjusting the separation device are provided. Depending on the size or the material properties of the suspension elements, like the strength or spin, the separation device may be adjusted.

The separation device according to the present invention may also be provided as a spare part. That means said separation device may be used in any known transportation assembly for discharging a sausage shaped product, like sausages, out of a clipping machine to a rod-like element, like a smoking rod.

Further advantages and a preferred embodiment of the present invention will be described in the following together with the drawings listed below. The expressions "left", "right", "below" and "above" used in the following description, are referred to the drawings in an alignment such that the reference numbers and the notation of the Figs. used can be read in normal orientation.

BRIEF DESCRIPTION OF DRAWINGS

In the drawings:

FIG. 4: is a cross-sectional view of the transportation assembly according to FIG. 3, in a vertical plane through the guiding element;

DETAILED DESCRIPTION OF THE INVENTION

Figure 1:
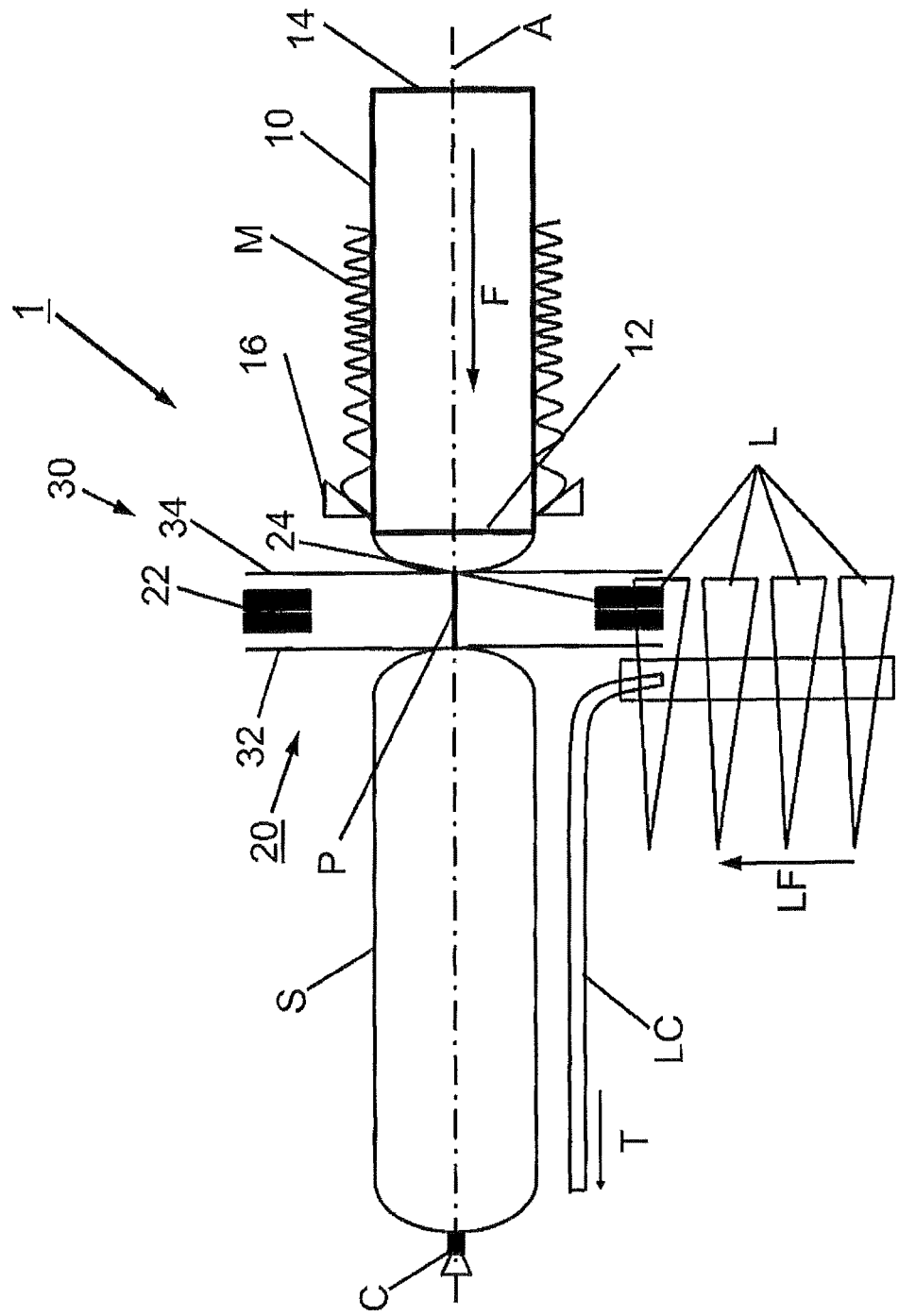
FIG. 1: is a schematic view to a known clipping machine.

A known clipping machine 1 for producing sausage-shaped products S according to FIG. 1, comprises, as main components, a circular cylindrical filling tube 10 having a longitudinally extending central axis A and being made of stainless steel, wherein a tubular packaging casing M made of a thin sheet material is stored on the filling tube 10, gathering means 30 for gathering the filled tubular packaging casing M and for forming a plait-like portion P thereto are arranged downstream filling tube 10, and a clipping device 20 for closing the filled tubular packaging casing M by applying a closure means, like a closure clip C, to said plait-like portion P.

As it can be inferred from FIG. 1, horizontally arranged filling tube 10 has a left end 12 facing clipping device 20 and a right end 14 coupled to a filler arrangement (not shown in FIG. 1) including a pump for feeding filling material through filling tube 10 in a feeding direction F. A casing brake device 16 is arranged on filling tube 10 in the vicinity of left end 12 of filling tube 10 in order to control the movement of tubular packaging casing M when pulled-off from filling tube 10 by the filling pressure.

Positioned immediately downstream left end 12 of filling tube 10, clipping device 20 is arranged and coaxially aligned to filling tube 10. Clipping device 20 comprises a first and a second pair of clipping tools 22, 24, wherein each pair of clipping tools 22, 24 includes a punch and a die. Gathering means 30 includes a first displacer unit 32 and a second displacer unit 34, wherein first displacer unit 32 is positioned downstream second displacer unit 34. First and a second pair of clipping tools 22, 24 of clipping device 20 are positioned between first and second displacer units 32, 34.

Furthermore, a feeding device for feeding suspension elements, like loops L, is positioned closed to clipping device 20, and in a manner that the front most loop of loops L may be caught by one of closing tools 22, 24 and may be attached to plait-like portion P of gathered casing M by closure clip C which is applied to plait-like portion P. A catching device LC for catching suspension element or loop L just fixed to the filled tubular or packaging casing material M, is provided in the region of clipping device 20, with a tip end closed to front most loop L. Along catching device LC, loop L of sausage-shaped product S is guided in a transportation direction T.

Figure 2:
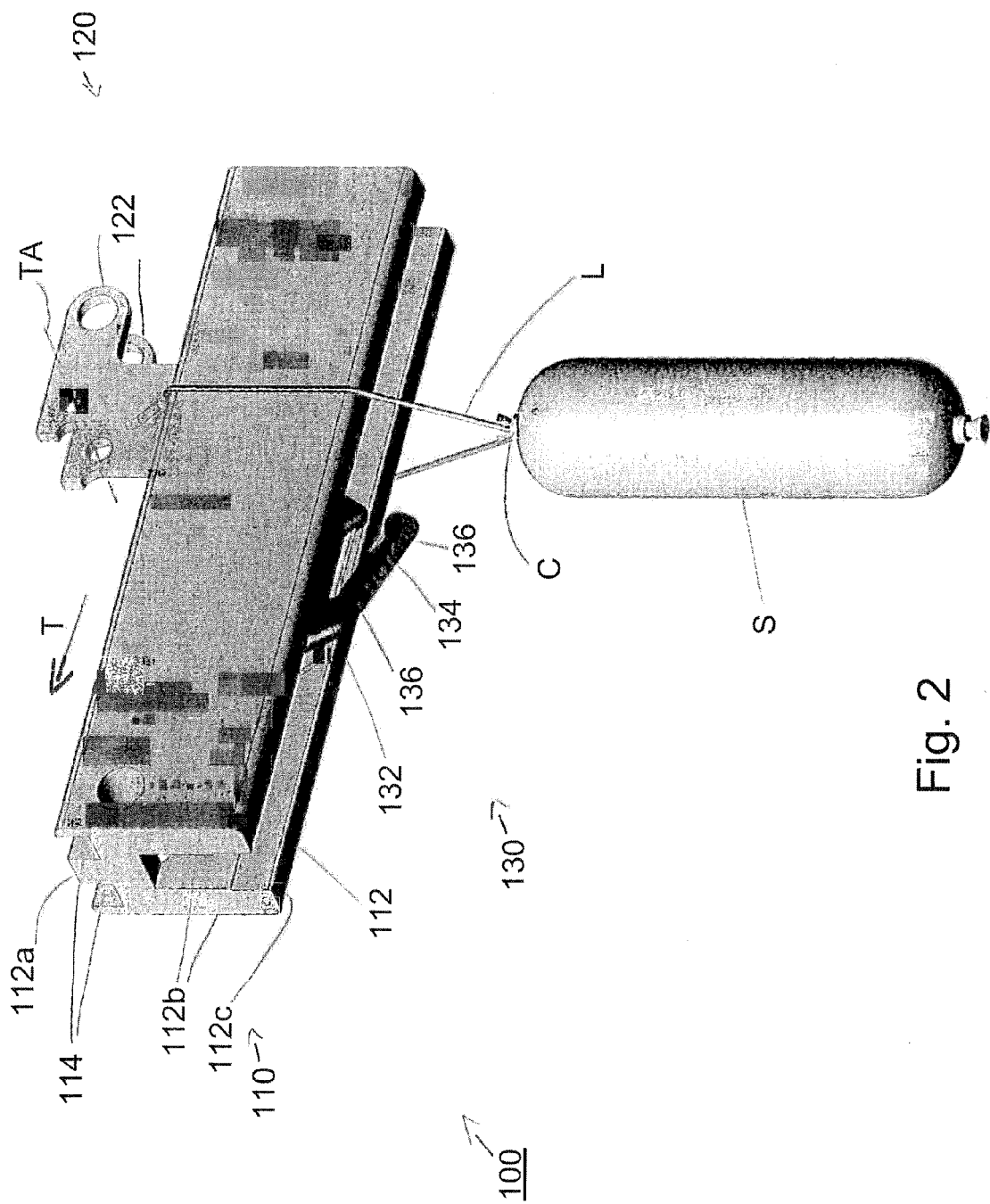
FIG. 2: is a schematic and perspective view to an embodiment of the transportation assembly according to the present invention, with a sausage-shaped product hanging on the guiding device.

FIG. 2 is a schematic and perspective view to an embodiment of a transportation assembly 100 according to the present invention. Transportation device 100 includes a guiding device 110 and a transport unit 120. For an easier understanding of the present invention, in FIGS. 2 to 4, only parts of guiding device 110 and transport device 120 are shown.

Guiding device 110 comprises a guiding element 112 in the form of an approximately horizontally arranged bar having a cross-sectional shape similar to the letter "H" and being, held in place by respective holders (not shown). Guiding element 112 is of a rectangular cross section and has at least an approximately planar upper surface 112a, two guiding side surfaces 112b and a bottom surface 112c. In upper surface 112a, two parallel grooves 114 are arranged, which extend in the longitudinal direction of guiding element 112 and parallel to transportation direction T.

In FIG. 2, a sausage-shaped product S is hanging on guiding element 112 of guiding device 110 for being transported in transportation direction T. Loop L of sausage-shaped product S surrounds guiding element 112 and is pulled downwardly by the weight of the filled tubular casing material. Loop S in this situation is in its opened configuration. That means the upper section of loop L has an approximately rectangular shape, according to the cross section of guiding element 112, and the lower section of loop L has the form of a triangle with two straight portions extending from closure clip C towards side surfaces 112b of guiding element 112.

Transport device 120 is arranged above guiding element 112, and includes two transport elements 122 in the form of hooks. Said transport elements or hooks 122 engage grooves 114 of guiding element 112 for moving sausage-shaped product S along guide element 112 in transportation direction T. In FIG. 2, hooks 122 are in a holding position, in which the lower ends of hooks 122 are guided in grooves 114 and engage one loop L of one sausage-shaped product S. For releasing the sausage-shaped product S from transport device 120, e.g. at a predetermined position on storage elements, like smoking rods (not shown), hooks 122 may be pivoted about a pivot axis TA counterclockwise, whereby hooks 122 leave grooves 114 and coming out of engagement with loops L.

Guiding element 112 of guide device 110 is part of a production line for producing sausage-shaped products S. Guide element 112 is arranged downstream a clipping machine, like one shown in FIG. 1. Guide element 112 is coupled by its right end (according to FIG. 2) to the left end of a device for catching sausage-shaped products S by their loops L, like catching device LC of FIG. 1, to enable loop L attached to a just filled tubular casing packaging to be transferred from clipping machine 1 via catching device LC to guiding element 112 of guiding device 110. To the right end of guiding element 112 of guide device 110 of FIG. 2, a rod like element, like a smoking rod, is arranged longitudinally extending in transportation direction T, on which the sausage-shaped products S transported along guiding element 112 by transport device 120, are stored for further processing.

Furthermore, guiding device 110 comprises a separation device 130 arranged in a groove in bottom surface 112c of guiding element 112. Separation device 130 has an approximately planar, vertically arranged body 132. Body 132 of separation device 130 exceeds bottom surface 112c of guiding element 112 vertically in downward direction. In the portion of body 132 of separation device 130, which exceeds guiding element 112, a V-shaped cutout 134 is arranged, with its open end directed in the counter direction of transportation direction T. Along the straight portions of V-shaped cutout 134, cutting edges in the form of blades 136 are arranged facing each other with their sharpened edges.

Body 132 of separation device 130 exceeds bottom surface 112c of guiding element 112, but remains inside loop L when in the opened configuration. That means the vertical height of the portion of body 132 extending from bottom surface 112c of guiding element 112, is smaller than the vertical height the triangular shape of lower section of loop L when in the opened configuration. In other words, in the opened configuration, loop L of sausage-shaped product S may pass separation device 130 without being infringed by separation device 130.

Figure 3:
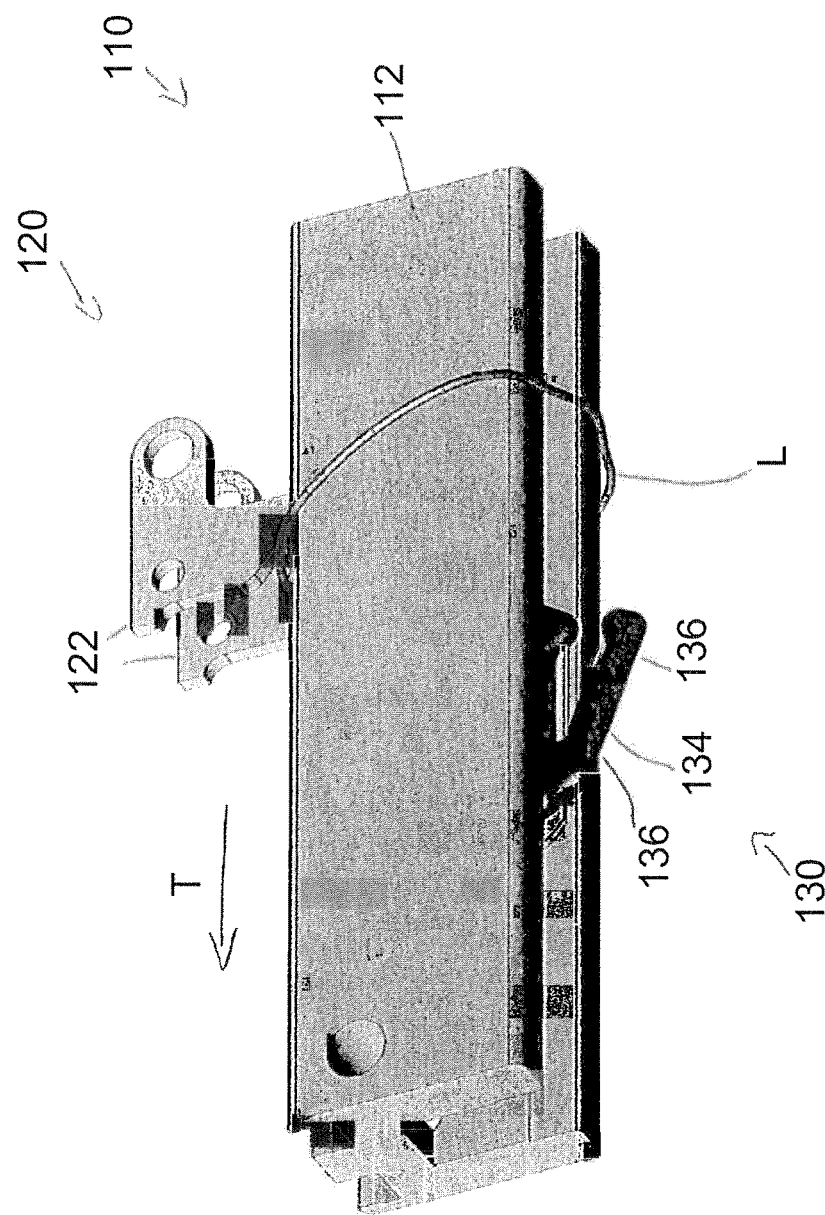
FIG. 3: is a schematic and perspective view to the embodiment of the transportation assembly according to FIG. 2, with a single suspension element hanging on the guiding device.

In FIG. 3, a schematic and perspective view to the embodiment of the transportation assembly according to FIG. 2 is shown, with a single suspension element or loop L hanging on guiding element 112 of guide device 10. Loop L is engaged by hooks 122 of transport device 120 for being transported in transportation direction T.

As it can be seen in FIG. 3, loop L is not in the opened configuration as described in conjunction with FIG. 2. Since no filled tubular packaging casing is attached to loop L, it is not pulled downwardly into the opened configuration, but remains in a "closed" configuration, in which the lower portion of loop L is warped towards bottom surface 112c of guiding element 112 by its spin. Accordingly, the vertical height of the lower portion of loop L is smaller than the vertical height of the portion of body 132 extending from bottom surface 112c of guiding element 112. Loop L, when in the closed configuration, engages V-shaped cutout 134 of separation device 130, when transported along guiding element 112 of guide device 110.

FIG. 4 is a cross-sectional view of transportation assembly 100 according to FIG. 3, in a vertical plane through guiding element 112.

As it can be seen in FIG. 4, separation device 130 further comprises a mounting device 140. Body 132 of separation device 130 is arranged in a groove in bottom surface 112c of guiding element 112, and mounted thereto by mounting device 140. Mounting device 140 includes a bracket 142 which has a generally T-shaped or L-shaped configuration with a vertically arranged portion 142a and a horizontally arranged portion 142b. Bracket 142 is fixed to guiding element 112 via horizontal portion 142b by two screws 144.

Body 132 of separation device 130 is fixed to vertical portion 142a by two screws (not shown). A first screw is mounted in a first, circular hole 146 in vertical portion 142a, and the second screw is mounted in a second, elongated hole 148 in vertical portion 142a. As it can be inferred from FIG. 4, by means of circular hole 146 and elongated hole 148, the vertical height of the portion of body 132 extending from bottom surface 112c of guide element 112 may be adjusted. Also, by adjusting separation device 130, the decline of the gutting edges or blades 136 may be changed, e.g. dependent on the material or diameter of the material of loops L.

While producing a sausage-shaped product or sausage S, filling material is fed into a tubular packaging material M, which is closed by a closure means, like a closure clip C, when a predetermined portion of filling material M has been fed. Normally, together with said clip C, a suspension loop L is fixed to the respective end of sausage S. While feeding said loop L to closing tools 22, 24 and closure clip C respectively, said loop L is caught by catching device LC which engages suspension loop L. Thereafter, sausage S is fed out of clipping machine 1 by a chute or a belt conveyor (not shown). Thereby loop L is pulled over catching device LC, and placed on guiding element 112 of guiding device 110.

Transport elements or hooks 122 of transport device 120 are guided in grooves 114 of guiding element 112 and thereby engage loop L of sausage-shaped product S which is transported in transportation direction T for being stored on a rod-shaped element, like a smoking rod, positioned downstream guiding element 112 of guiding device 110.

In the case shown in FIG. 2, where a filled tubular packaging casing is attached to loop L by a closure clip C, loop L is in an opened configuration. While being transported along guiding element 112, loop L passes separation device 130 without any problems.

In the case shown in FIG. 3, no filled tubular packaging casing is attached to loop L. Loop L is in a closed configuration with its lower portion warped towards bottom surface 112c of guiding element 112.

A single loop L, when further transported along guiding element 112 and a smoking rod arranged downstream guiding element 112, may stick at hooks 122, also when pivoted in a release position, due to the missing weight of the filled tubular packaging casing, and may thus be further transported along the smoking rod. In this case, said single loop L will pull off all sausage-shaped products S already stored on the smoking rod, from sad smoking rod. This will cause a high amount of additional costs by loss and maintenance.

When being further transported along guiding element 112 by transport device 120, loop L engages separation device 130. The lower portion of loop L is caught by V-shaped cutout 134 and is pulled along cutting edges of blades 136, whereby loop L is separated by cutting. Opened or cut loop L may than be further transported in transportation direction T or may immediately fall off from transportation assembly 100.

Separation device 130 has been described as comprising two blades 136 arranged in V-shaped cutout 130. Naturally, one single blade may be sufficient for cutting a single loop L caught by separation device 130.

Moreover, a separation device not necessarily needs to have a V-shaped cutout. It may be sufficient to provide a cutting edge or blade in a position, in which a single loop is securely cut by said blade.

In FIGS. 2 to 3, guiding element 112 is not shown in its entire length, but only a portion thereof. Separation device 130 is positioned centrally at said portion of guiding element 112. It has to be understood that separation device 130 may be arranged at any suitable position along guiding element 122, e.g. in the region of one of the ends or in its middle portion.

Moreover, guiding element 112 not necessarily needs to have a rectangular cross section. Essentially in the sense of the present invention is that a separation device may be positioned at its bottom surface or a cutout in the bottom portion, such that a single loop may be caught and cut by said separation device.

The invention claimed is:

1. A transportation assembly for transporting sausage shaped products, like sausages, out of a clipping machine for producing sausage-shaped products in a transportation direction to a rod-like storing element, like a smoking rod, wherein each sausage-shaped product comprises a filled tubular or bag-shaped packaging casing closed on at least one end by a closing means, like a closure clip, and a suspension element, like a suspension loop, attached to the end closed by said closure means,
   the transportation assembly comprises a guiding device having a bar-shaped guiding element along which the sausage-shaped product is guided by its suspension element, and a transportation device for transporting the sausage-shaped product along the guiding element by engaging the suspension element of the sausage-shaped product, wherein the suspension element is held in an open configuration by the weight of the filled tubular or bag-shaped packaging casing to which it is attached by the closure means, and
   wherein a separation device is provided at the guide element, for removing a suspension element from the guiding element, which is transported by the transportation device without a tubular or bag-shaped packaging casing attached thereto.

2. The transportation assembly according to claim 1, wherein the guiding element comprises at least two guiding surfaces for guiding the suspension element wherein the guiding surfaces extend at least substantially parallel to each other as well as at least substantially parallel to the transportation direction and are arranged in a distance across the transportation direction for spreading the suspension element.

3. The transportation assembly according to claim 1, wherein the guiding element has an at least partially approximately planar bottom portion to which the separation device is attached.

4. The transportation assembly according to claim 1, wherein the separation device comprises a cutting edge for cutting the suspension element guided along said cutting edge.

5. The transportation assembly according to claim 1, wherein the separation device comprises an approximately V-shaped cutout facing opposite to the transportation direction.

6. The transportation assembly according to claim 5, wherein at least one cutting edge is arranged in said V-shaped cutout.

7. The transportation assembly according to claim 1, wherein adjustment means for adjusting the separation device are provided.

8. A separation device according to claim 1, for use in a transportation assembly for discharging a sausage shaped product, like sausages, out of a clipping machine to a rod-like element, like a smoking rod.

* * * * *